United States Patent
Vovos et al.

(10) Patent No.: US 12,151,670 B2
(45) Date of Patent: Nov. 26, 2024

(54) PARALLEL VARIABLE SPEED GENERATOR CONTROL

(71) Applicant: BAE Systems Controls Inc., Endicott, NY (US)

(72) Inventors: Robert J. Vovos, Vestal, NY (US); Arthur P. Lyons, Maine, NY (US)

(73) Assignee: BAE Systems Controls Inc., Endicott, NY (US)

( * ) Notice: Subject to any disclaimer, the term of this patent is extended or adjusted under 35 U.S.C. 154(b) by 116 days.

(21) Appl. No.: 17/843,277

(22) Filed: Jun. 17, 2022

(65) Prior Publication Data

US 2023/0406286 A1 Dec. 21, 2023

(51) Int. Cl.
*B60W 20/50* (2016.01)
*B60W 10/08* (2006.01)
*B60W 50/00* (2006.01)

(52) U.S. Cl.
CPC ............ *B60W 20/50* (2013.01); *B60W 10/08* (2013.01); *B60W 2050/001* (2013.01); *B60W 2510/104* (2013.01); *B60W 2710/081* (2013.01); *B60W 2710/083* (2013.01); *B60W 2710/086* (2013.01)

(58) Field of Classification Search
None
See application file for complete search history.

(56) References Cited

U.S. PATENT DOCUMENTS

| | | | |
|---|---|---|---|
| 6,717,281 B1 | 4/2004 | Brandon et al. | |
| 7,042,110 B2 | 5/2006 | Mikhail et al. | |
| 7,687,929 B2 | 3/2010 | Fattal | |
| 10,166,966 B2 | 1/2019 | Dufford | |

(Continued)

FOREIGN PATENT DOCUMENTS

| EP | 2 133 251 B1 | 12/2014 |
|---|---|---|
| EP | 2 987 673 A1 | 2/2016 |

(Continued)

OTHER PUBLICATIONS

International Search Report, PCT/US23/23536, mailed Aug. 14, 2023, 11 pages.

(Continued)

*Primary Examiner* — Todd Melton
*Assistant Examiner* — Jason R Roberson
(74) *Attorney, Agent, or Firm* — Scully Scott Murphy & Presser PC; Gary McFaline

(57) ABSTRACT

A system for controlling load sharing between multiple generators mechanically coupleable to the output shaft of a prime mover is provided. The system may comprise a first processor; and at least two inverters operably connectable to at least two generators, respectively. The generators provide AC power to the respective inverter and each inverter provides DC power to a respective DC link. Each inverter may comprise a processor configured to control a respective generator. The processor may be configured to receive a common speed command from the first processor, adjust the common speed command based on a speed of the same output shaft to create a droop, determine a torque command based on the adjusted speed command and supply the determined torque command to the corresponding generator.

18 Claims, 12 Drawing Sheets

(56) References Cited

U.S. PATENT DOCUMENTS

| | | | |
|---|---|---|---|
| 2008/0106224 A1* | 5/2008 | Fu | B60K 6/405 |
| | | | 318/139 |
| 2008/0157594 A1 | 7/2008 | Peterson et al. | |
| 2014/0001873 A1* | 1/2014 | Tian | H02P 9/305 |
| | | | 307/87 |
| 2014/0008988 A1 | 1/2014 | Clarke et al. | |
| 2015/0203092 A1 | 7/2015 | Johri et al. | |
| 2016/0276962 A1 | 9/2016 | Khalil et al. | |
| 2018/0087241 A1* | 3/2018 | Hoshino | E02F 9/2066 |
| 2019/0202439 A1* | 7/2019 | Cho | B60W 50/0098 |
| 2022/0126713 A1* | 4/2022 | Liu | B60W 10/26 |
| 2022/0135038 A1 | 5/2022 | Appleton | |

FOREIGN PATENT DOCUMENTS

| | | |
|---|---|---|
| EP | 2 466 742 B1 | 11/2020 |
| EP | 2 384 397 B1 | 3/2022 |
| JP | 2013159146 A * | 8/2013 |
| WO | 2017/048310 A1 | 3/2017 |

OTHER PUBLICATIONS

Cosse, R. et al., "Fundamentals of Turbine/Generator Speed Control: A Graphical Approach for Islanding Applications", IEEE Industry Applications Magazine, Jul.-Aug. 2013, pp. 56-62, vol. 19, No. 4.

Prousalidis, J. et al., "Reactive power sharing in ship energy systems with shaft generators", Journal of Marine Engineering & Technology, 2009, pp. 21-38, vol. 8, No. 1.

* cited by examiner

PARALLEL VARIABLE SPEED GENERATOR CONTROL

FIELD OF THE DISCLOSURE

This disclosure relates to multiple generators mechanically coupled to a shaft of a prime mover. This disclosure also relates to a system and a method for controlling the output power of each generator.

BACKGROUND

Multiple generators may be mechanically coupled to a prime mover, such as an engine. The power supplied by each generator may be controlled. However, the power split between each generator may not be deterministic. For example, a known approach to controlling the power supplied by each generator is to have one inverter/generator as a primary controller of the speed of the output shaft of the prime move and the other inverters/generators as secondary controller of the speed. In this approach, the primary controller operates a speed mode (speed control loop) whereas the second controllers operate in a torque mode (torque control loop). For example, the system controller may include a speed command to the primary controller and torque command to the second controller. The system controller may also issue a torque command to the prime mover This approach may generally achieve a steady state load sharing, but, when the torque and speed changes, the load sharing is poor. Furthermore, when a fault occurs, the controllers do not quickly respond. For example, when the primary controller fault, the engine may be overloaded and potentially damaged by reverse operation because the other controllers are running a torque control loop.

In other known systems, such as a microgrid, a plurality of prime mover/generators (genset) are electrically connected in parallel to an AC link. The multiple gensets share power to the load to match the AC waves.

SUMMARY

Accordingly disclosed is a system comprising a first processor and at least two inverters. Each inverter is respectively connectable to a generator. At least two generators are mechanically coupleable to a same output shaft of an engine. Each generator provides an AC power to the corresponding inverter. Each inverter provides DC power to a DC link. Each inverter comprises a processor. The processor may be configured to control its corresponding generator. The processor may be configured to receive a common speed command from the first processor, adjust the common speed command based on a speed of the output shaft to create a droop, determine a torque command based on the adjusted speed command and supply the determined torque command to the corresponding generator.

The generators may be directly or indirectly coupled to the same output shaft. For example, the system may further comprise a gearbox. An input shaft of the gearbox may be connected to the same output shaft of the engine and the generators may be mounted on one or more output shafts of the gearbox, respectively.

The speed may be sensed at the same output shaft of the engine or the one or more output shafts of the gearbox. For example, the system may further comprise one or more speed sensors. The speed sensor may determine the speed of the same output shaft of the engine or the speed of the one or more output shafts of the gearbox.

In another aspect of the disclosure, the speed may be determined without sensors such as based on a back EMF.

In an aspect of the disclosure, the first processor may be configured to output a torque command to the engine and the common speed command to each inverter via a controller area network (CAN) based on a target system power level. The common speed command may be asynchronously received by the processor in the inverters.

In aspect of the disclosure, the processor in each inverter may be configured to determine the droop by applying a set droop gain to a power output by the corresponding generator and subtract the droop from the common speed command from the first processor.

In an aspect of the disclosure, when a fault is detected in an inverter or a corresponding generator, the processor in the other inverters may respond to the fault by adjusting torque command to the generator. In another aspect of the disclosure, the processor in an inverter may be configured to a disable the inverter which the fault is detected or the invertor which corresponds to a generator which the fault is detected such that the generator does not provide any torque.

In an aspect of the disclosure, the processor in each inverter may determine the torque command based on the adjusted speed command using proportional integral (PI) control.

In an aspect of the disclosure, the system may further comprise the engine having the same output shaft, and the at least two generators.

In an aspect of the disclosure, each generator may be is a permanent magnet generator. The at least two generators may be two generators.

Also disclosed is a hybrid electric vehicle (HEV) comprising an internal combustion engine, at least two generators, at least two inverters, and system processor. The internal combustion engine has an output shaft. Each generator is mechanically coupled to same output shaft of the internal combustion engine. Each inverter is respective connected to its corresponding generator. Each generator produces a three-phase AC where the three-phase AC of the respective generators are not electrically connected to each other. The system processor is connected to the internal combustion engine and each inverter via a controller area network (CAN). The system processor may be configured to issue a common speed command to each inverter via the CAN to achieve a target power level. Each inverter comprises a processor. The processor may be configured to control the corresponding generator. Each processor may be configured to receive the common speed command from the processor, adjust the common speed command based on a speed of the same output shaft to create a droop, determine a torque command based on the adjusted speed command and supply the determined torque command to the respective generator.

In an aspect of the disclosure, the system processor may be configured to issue a torque command to the internal combustion engine. In another aspect, the system processor may be configured to issue a disable command to an inverter in response to a detection of a fault condition at the inverter or a generator corresponding to the inverter.

In an aspect of the disclosure, in response to a detection of a fault condition at an inverter or a generator corresponding to the inverter, the processor in the other inverters may adjust the torque command to its corresponding generator.

In an aspect of the disclosure, the processor in each inverter may be configured to determine the droop by applying a set droop gain to a power output by the respective generator and subtract the droop from the common speed command from the system processor, The generators may be directly or indirectly coupled to the same output shaft. For example, the HEV may further comprise a gearbox. An input shaft of the gearbox may be connected to the same output shaft of the engine and the generators may be mounted on one or more output shafts of the gearbox, respectively.

The speed may be sensed at the same output shaft of the engine or the one or more output shafts of the gearbox. For example, the HEV may further comprise one or more speed sensors. The speed sensor may determine the speed of the same output shaft of the engine or the speed of the one or more output shafts of the gearbox.

DETAILED DESCRIPTION

In accordance with aspects of the disclosure, two or more generators are mechanically coupled to the same shaft of a prime mover, e.g., mechanically coupled in parallel. Each generator may be independently controlled by its own inverter (controller). Each inverter operates in a speed control loop (speed mode) to control the torque output by the respective generator (torque on the same shaft) which effectively controls the power delivered by each generator. Each inverter may have a common set point (common control speed) and regulate the torque based on a speed (and torque feedback) to achieve load sharing.

The systems described herein may be used in any moving vehicle with a prime mover having an output shaft where inverters have full authority such as a bus, car, truck, ship and submarine. Additionally, the systems described herein may also be used for military vehicles. The vehicle(s) may be a hybrid electric vehicle such as a series hybrid. The systems may be used to charge a load such as a battery or an electric grid. For example, the systems may be used as a stationary power supply (genset). The systems also may be used for propulsion. In other aspects, the systems may be used to supply power to accessories.

Figure 1A:
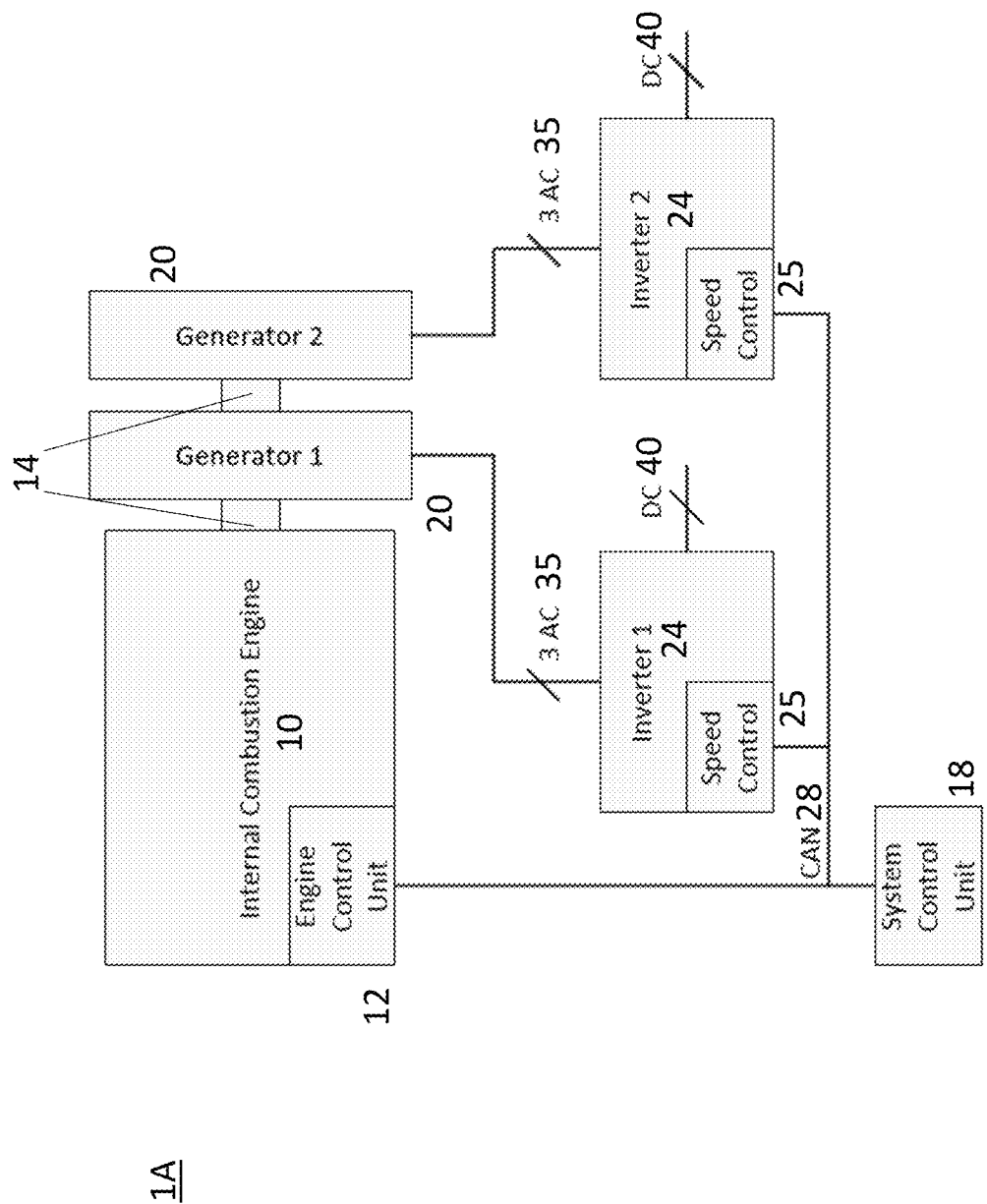
FIG. 1A illustrates a system in accordance with aspects of the disclosure where multiple generators are mounted to the same output shaft of an engine.

FIG. 1A illustrates an example of a system 1A in accordance with aspects of the disclosure. The system 1A has an internal combustion engine 10 (example of a prime mover). The internal combustion engine 10 has an output shaft 14. Multiple generators 20 (e.g., Generator 1 and Generator 2) may be mounted to the same output shaft 14 (mounting is an example of mechanically coupled). As depicted in FIG. 1A, there are two generators. However, more than two generators may be mounted to the same output shaft 14. The output shaft 14 extends through Generator 1 and Generator 2.

In an aspect of the disclosure, the same type of generator may be used for each generator in the system 1A. Additionally, each generator may have the same rating (maximum output power). The generators 20 may be permanent magnet generators such as surface permanent magnet generator or interior permanent magnet generator. However, other types of generators may be used such as wound-field, induction, synchronous reluctance (SynR) and switched reluctance generators/motors. The generators 20 are mechanically paralleled.

Figure 1B:
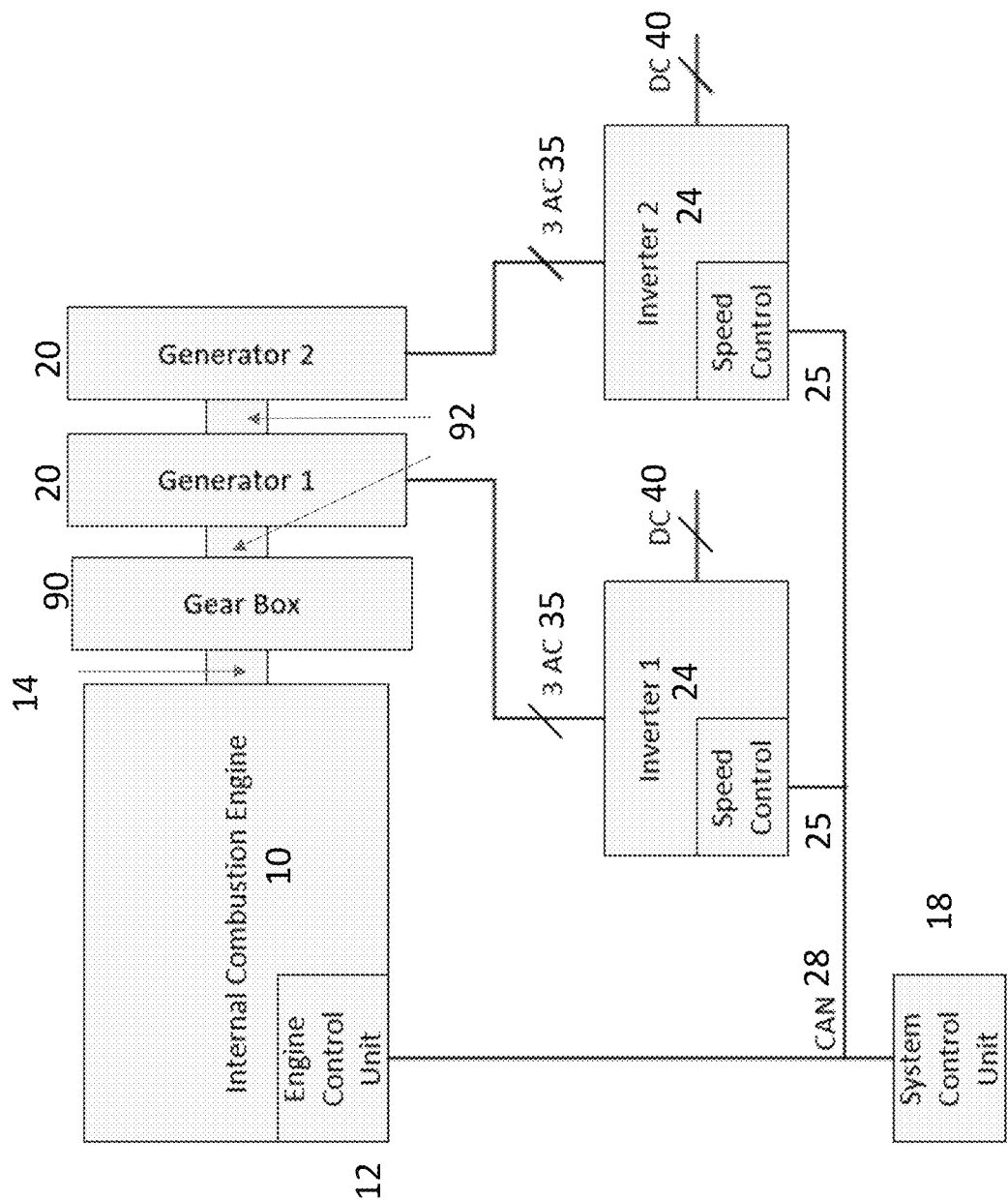
FIG. 1B illustrates a system in accordance with aspects of the disclosure where multiple generators are indirectly mounted to the same output shaft of an engine via a gear box.
Figure 1C:
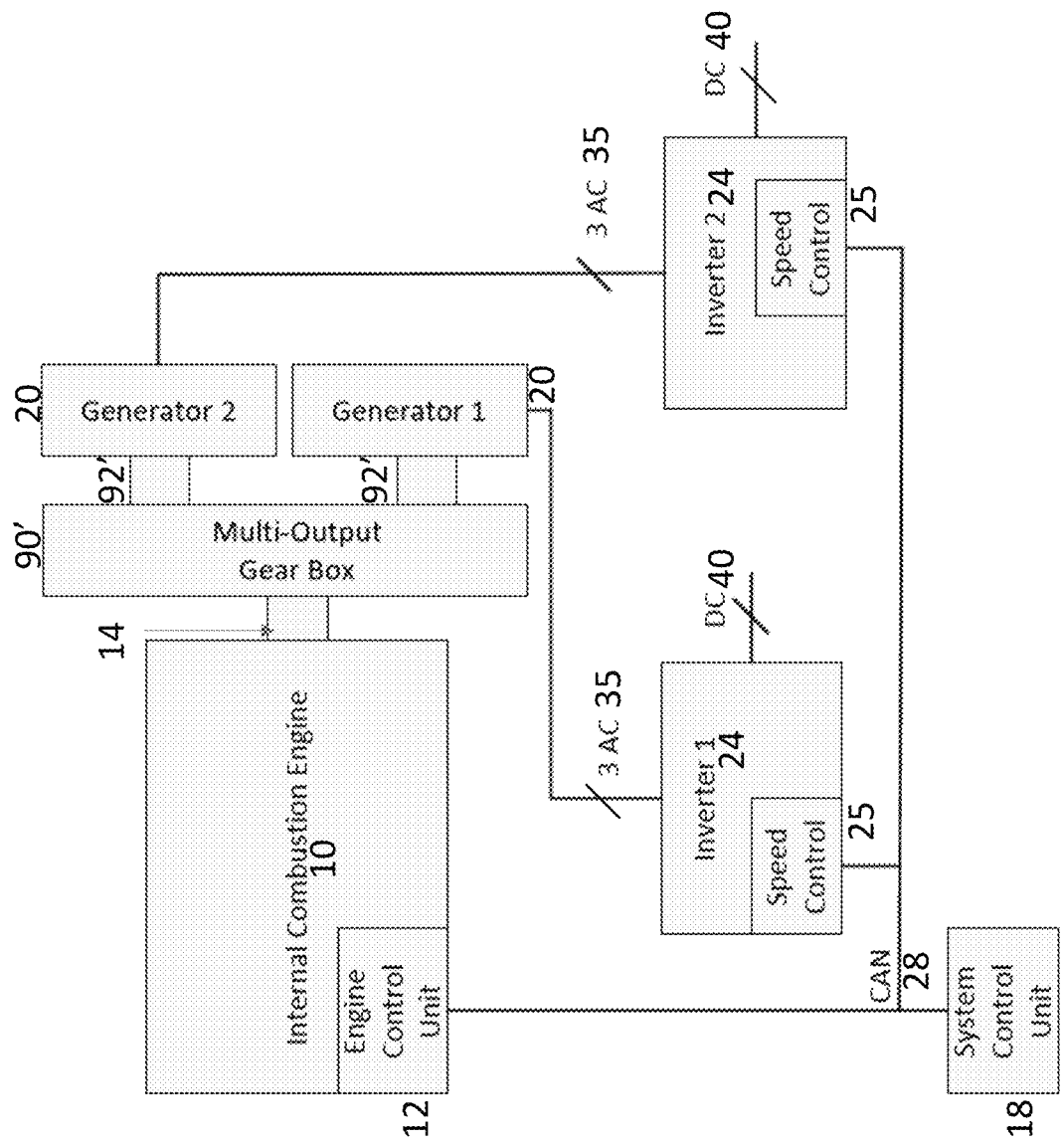
FIG. 1C illustrates another system in accordance with aspects of the disclosure where multiple generators are indirectly mounted to the same output shaft of an engine via a gear box.

While in FIG. 1A, the generators 20 are directed mounted to the same output shaft 14, in other aspects, the generators 20 may be indirectly mounted such as via a gearbox 90, 90' as shown in FIGS. 1B and 1C (another example of mechanically coupled to the same output shaft 14 of the engine 10). For example, a gearbox 90 may be mounted to the same output shaft 14 (input shaft of gearbox 90). The gearbox 90 may have one output shaft 92 (as shown in FIG. 1B) or multiple output shafts 92' for gearbox 90' (shown in FIG. 1C). The generators 20 may be mounted to the output shaft 92 of the gearbox 90 or a respective generator (e.g., Generator 1) may be individually mounted to an output shaft 92' of the gearbox 90'(where there is a single generator 20 mounted on a respective output shaft).

The gearbox 90, 90' provides for a fixed ratio of engine speed to generators speed. In an aspect of the disclosure, the speed of the engine may be different from the speed of the generators. This difference is known in advance (by the fixed speed ratio). Therefore, when one knows the speed of the generators, one also knows the speed of the engine.

When coupled to the engine 10 (referred to herein as the genset), the generators 20, respectively provide three-phase AC electrical power 35. In an aspect of the disclosure, the three-phrase electrical power 35 may not be electrical connected, this the value of AC links may be different. The generators 20 may provide a variable frequency AC power. The generators 20 may be a high voltage generator.

The engine 10 may use gasoline, a diesel or a compressed natural gas (CNG) (collectively "fuel").

Each generator 20 is coupled to an inverter 24 (e.g., Generator 1 is coupled to Inverter 1 and Generator 2 is coupled to Inverter 2).

Figure 4A:
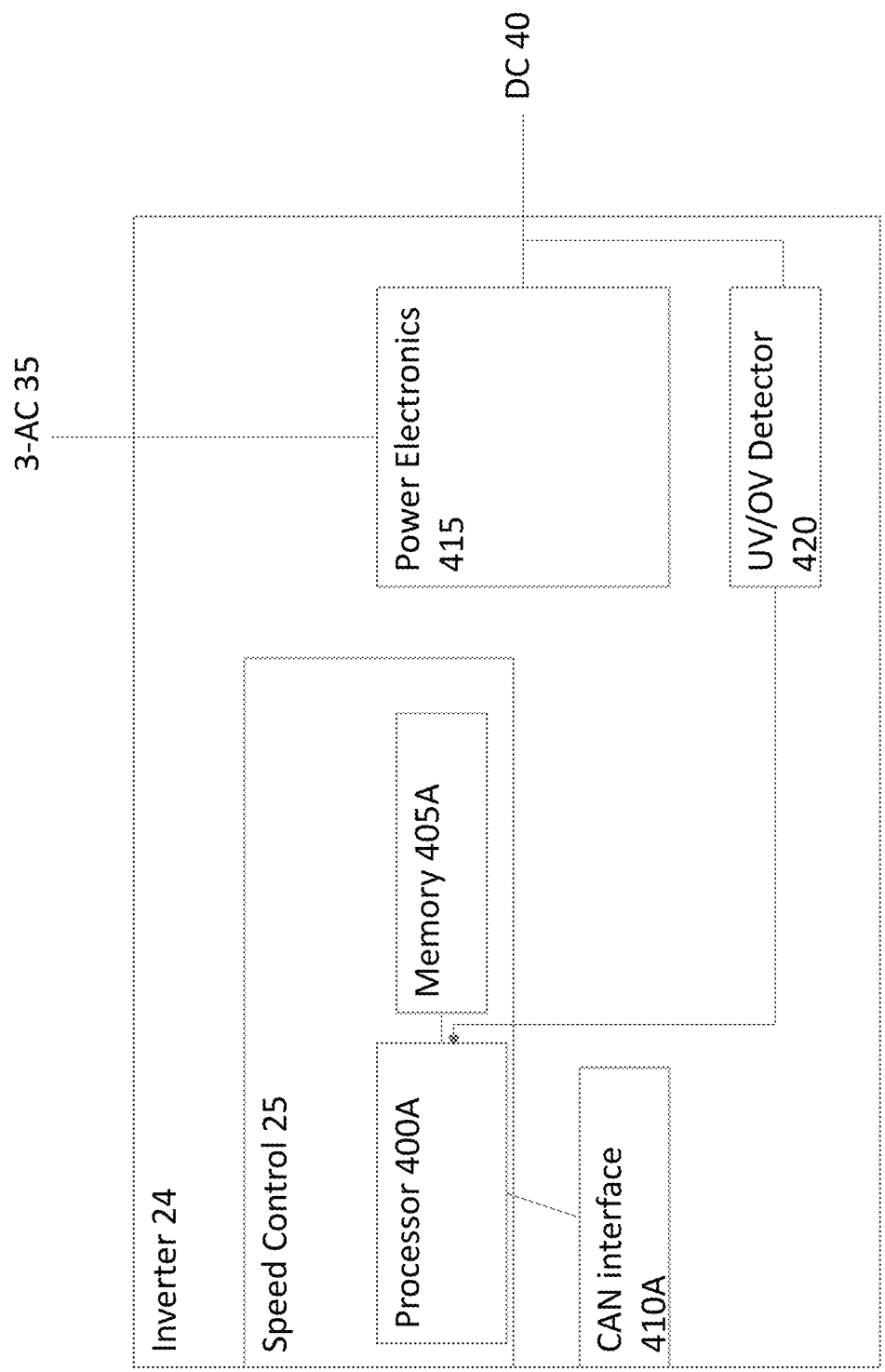
FIG. 4A illustrates an inverter in accordance with aspects of the disclosure.

Each inverter 24 has a speed control 25 as shown in FIG. 4A. The speed control 25 may comprise a processor 400A and memory 405A. The processor 400A may be connected to the memory 405A.

The processor 400A may be a microcontroller or microprocessor or any other processing hardware such as a CPU, GPU, Field programmable gate array (FPGA) or Programmable logic device (PLD). The memory 405A may be separate from the processor 400A (as shown in FIG. 4A for clarity of the figure) or integrated in the same. For example, the microcontroller or microprocessor includes at least one data storage device, such as, but not limited to, RAM, ROM and persistent storage. In an aspect of the disclosure, the processor 400A may be configured to execute one or more programs stored in a computer readable storage device. The computer readable storage device can be RAM, persistent storage or removable storage. A storage device is any piece of hardware that is capable of storing information, such as, for example without limitation, data, programs, instructions, program code, and/or other suitable information, either on a temporary basis and/or a permanent basis.

Each inverter 24 may also comprise a communication interface. For example, the communication interface may be a Controller Area Network (CAN) 28 interface 410A.

Each inverter 24 may also have power electronics 415 for converting the three-phase AC 35 into DC for a DC link 40 (ADC converter). Each DC link 40 may be separate, e.g., not electrical connected. Thus, the value of each DC link 40 may be different. The DC link 40 may be connected to DC accessories. Each DC link 40 may also be connected to a load such as a battery or an electric grid. Each DC link 40 may also be connected to another inverter (not shown in FIGS. 1A-1C) which converts the DC into AC to power a motor for propulsion of a vehicle. In other aspects, another inverter (not shown) may be connected to AC accessories to power the same. For example, the AC accessories may comprise air compressors, air condition compressors and power steering pumps. The AC accessories are not limited to the examples provided herein. The phrase "AC accessories" used herein also refers to the sub-systems required for the accessory to function.

Figure 4B:
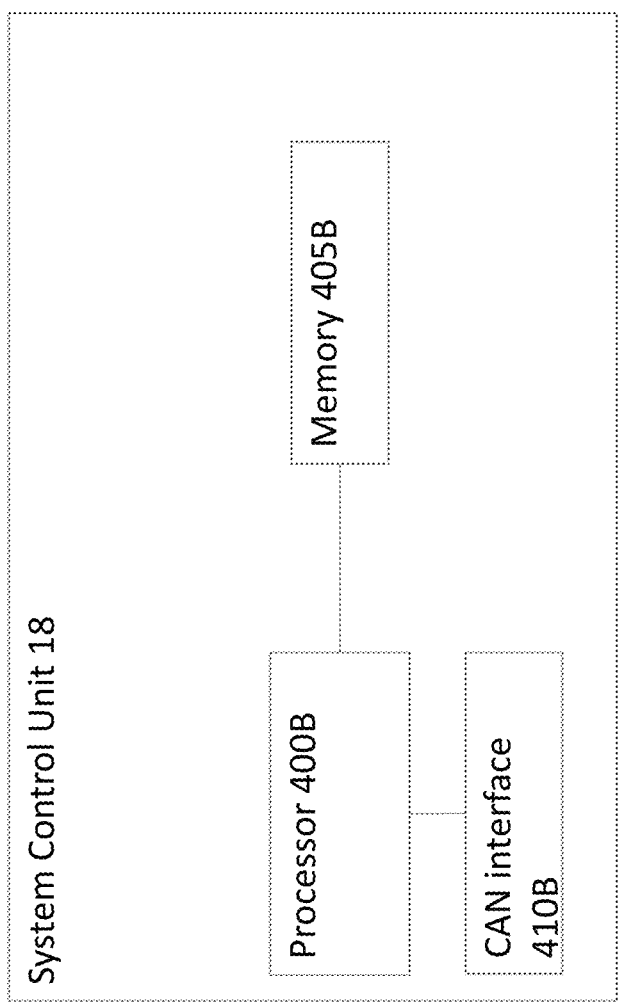
FIG. 4B illustrates a system control unit in accordance with aspects of the disclosure.

The system 1A, 1B, 1C also comprises a system control unit 18. The system control unit 18 may also comprise a processor 400B, a memory 405B and a communication interface (such as a CAN interface 410B). Similar to above, the processor 400B may be a microcontroller or microprocessor or any other processing hardware such as a CPU, GPU, Field programmable gate array (FPGA) or Programmable logic device (PLD). The memory 405B may be separate from the processor 400B (as shown in FIG. 4B for clarity of the figure) or integrated in the same. For example, the microcontroller or microprocessor includes at least one data storage device, such as, but not limited to, RAM, ROM and persistent storage. In an aspect of the disclosure, the processor 400B may be configured to execute one or more programs stored in a computer readable storage device. The computer readable storage device can be RAM, persistent storage or removable storage. A storage device is any piece of hardware that is capable of storing information, such as, for example without limitation, data, programs, instructions, program code, and/or other suitable information, either on a temporary basis and/or a permanent basis. The The system control unit 18 is configured to receive power requirements of the load and provide torque command to the engine 10 (via an engine control unit 12) and speed commands to the inverters 24.

When the system 1A, 1B, 1C (and in particular the genset) is used to supply power to a load, such as an electric grid or battery, the power requirement of the load may be based on the capacity of the load, state of charge (SOC) of the battery and/or a measurement of power delivered. Additionally, the power requirement may be a measure of a DC link 40 voltage. The power required may be received via CAN 28 from one or more sensors (not shown in FIGS. 1A-1C).

When the system 1A, 1B, 1C is used for propulsion (such as in a HEV), the power requirement may be based on a user request such as pressing a pedal for acceleration.

In an aspect of the disclosure, the memory 405B in the system control unit 18 may have one or more look up tables (LUT). The LUT may have a correspondence between power requirement and an engine torque. In other aspects, the LUT may have a correspondence between power requirement and engine speed.

Different engines may have different LUTs based on the performance and efficiency of the engines.

In an aspect of the disclosure, the system control unit 18 calculates the common speed for the inverters 24 from the torque command and the power requirement. The system control unit 18 transfers a common speed command to the inverters 24 via CAN 28. The system control unit 18 transfers the torque command to the engine control unit 12. The engine control unit 12 controls fueling to achieve the commanded torque.

Figure 2:
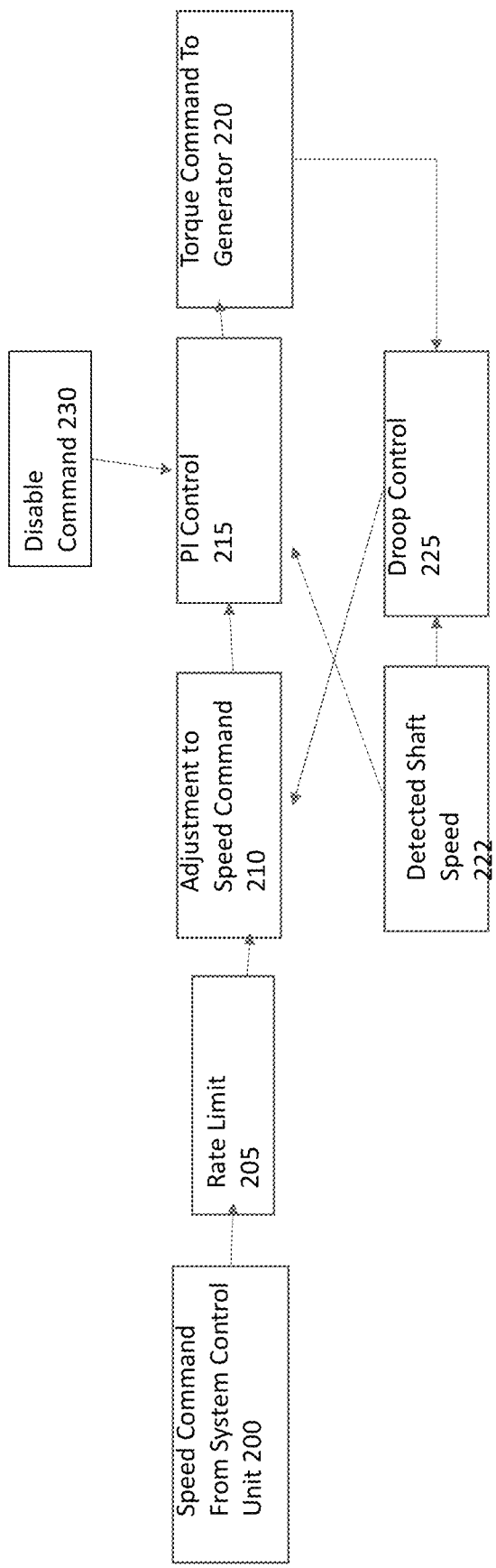
FIG. 2 illustrates a method of controlling a multiple generator system in accordance with aspects of the disclosure.

Each inverter 14 independently controls the generator torque to achieve the common commanded speed. FIG. 2 illustrates a method of controlling the generator torque in accordance with aspects of the disclosure. The functions described in FIG. 2 are executed by the processor in each inverter. For brevity, the following description will use the phrase "the inverter" instead of "the processor in the inverter".

In accordance with aspects of the disclosure, each inverter 24 has a speed control loop for regulating generator torque. In the speed control loop, the inverter intentional causes a droop such that load sharing is maintained both in steady state and under a transient condition such as where individual torque command to the generator or common speed command changes.

At 200, the inverter 24 receives the common speed command from the system control unit 18 via the CAN 28. Different inverters may receive the common speed command at different times. The different times may be a result of the CAN frame rate. Different inverters may receive in the common speed command in a different frame. For example, Generator 1 may receive the common speed command 100 ms apart from Generator 2.

At 205, the inverter 24 may implement a rate limit. A generator may have a maximum torque or speed it can handle. The rate limit may be set in advance and be less than this maximum. Additionally, the power electronics in the inverter 24 may be rated or sized for a set power level. The rate limit may account for the same. If there is a rate limit and the common speed command exceeds the rate limit, the command speed command is changed to equal the rate limit.

At 210, the inverter 24 implements the droop, output from the droop control 225. Specifically, the inverter 24 adjusts the common speed command from the system control unit 18 based on the droop. For example, the inverter 24 may subtract the droop from the common speed command. In generating mode, the power is a negative value and thus the droop is negative. When the droop is subtracted from the common speed command (since it is negative), the command increases.

Figure 3:
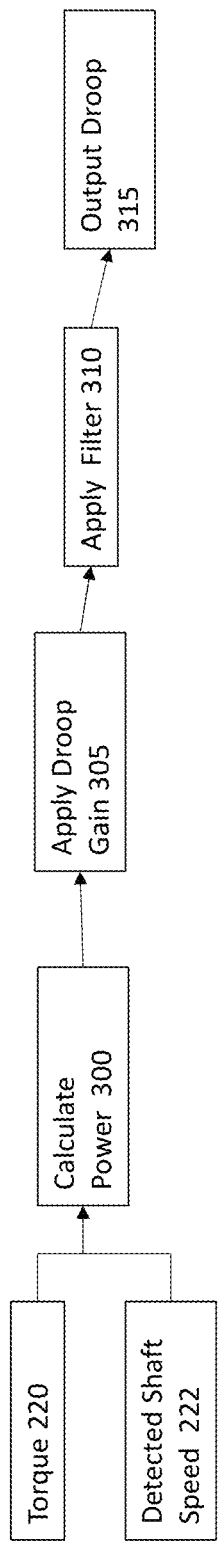
FIG. 3 illustrates a method of determining a droop for each generator in accordance with aspects of the disclosure.

FIG. 3 illustrates a method of determining the droop in accordance with aspects of the disclosure. The droop is based on a speed of a shaft). The speed may be measured at any shaft which as the same output shaft 14 (or if there is a gearbox 90, the output shaft 92 of the gearbox 90 or one or more output shafts 92' of the gearbox 90)'. This is because the shafts are mechanically coupled by a fixed ratio gearbox 90. 90' and thus detecting a speed on one of the shafts provides the speed of the others.

Since the generators 20 are mechanically coupled (in parallel) to the same shaft 14 and in turn to the engine, the speed of the shaft(s) is a function of the combined torques of the generators and engine torque (engine torque is positive and the generator torque is negative). When the torques are in balance (sum of the generator(s) torques versus torque of the engine), the shaft(s) speed constant. However, when there is an imbalance, the shaft(s) speed changes. Thus, in accordance with aspects of the disclosure, the speed is detected 222. In an aspect of the disclosure, the system 1A, 1B, 1C may have a speed sensor. In other aspects, the vehicle may have a speed sensor and the speed may be fed to each inverter 24 via CAN 28. In an aspect of the disclosure, the speed sensor may be a resolver, an encoder, a hall effect sensor. When a single speed sensor is used, similar to above with the common speed command, each inverter 24 may receive the sensed speed at different times. In an aspect of the disclosure, each inverter 24 may have its own dedicated speed sensor. This may be used when each generator 20 is coupled to a different output shaft 92' of the gearbox 90. When multiple sensors are used, each sensor may have a different error tolerance, either in its analog circuitry or in the analog to digital conversion. Additionally, each sensor may transfer the speed at slightly different times, e.g., different delays. The different tolerances may be determined using setup or a calibration of the system.

In other aspects, the speed may be determined sensorless using the back EMF of the generator (self-sensing) by each inverter 24.

The inverter 24 uses the detected shaft speed 222 and the current torque of the generator 220 to calculate the power supplied by the generator 300. Power is the current torque times the detected shaft speed. In some aspects of the disclosure, a filter may be used to filter the detected shaft speed. The filter may be a low pass filter and account for delays. For example, the speed sensor may have a set bandwidth and have a delay. Thus, the detected shaft speed may not be an instantaneous response to the change in speed.

At 305, the inverter 24 applies a droop gain on the calculated power. The droop gain is a value XX RPS/kW, where XX is real number. At minimum, the droop gain must be large enough to counter either the timing differences between when the different inverters receive the sensed speed or account for the different tolerances in the sensing by different sensors or sensing (a speed sensing error between the inverters 24). The droop gain is also set to have a minimum impact on the nominal operating speed. The droop gain may be determined based on a maximum speed of the generator 20 and maximum output power for the generator 20. For example, the droop gain may be set based on a preset speed percentage of the maximum operating speed. For example, if the maximum power is 100 Kw and maximum speed is 100 RPS, then the droop gain may be 0.05 RPS/kw for a 5% speed droop at full output power.

In an aspect of the disclosure, the droop gain may be preset in memory 405A. A larger droop gain may allow the system 1A, 1B, 1C to respond to a transient quicker, however a larger droop gain may lead to the shaft speed increasing beyond the commanded speed by a larger amount. The droop gain may be multiplied by the calculated power to obtain a preliminary speed droop.

At 310, the inverter 24 applies a filter to the preliminary speed droop. In an aspect of the disclosure, a low pass filter may be used to limit the bandwidth of the droop in order to prevent noise and minute transients from causing adjustment in the load sharing. Advantageously, if the disturbances make it into the final droop (output droop), they may cause a positive feedback effect where the noise is amplified in a loop. In an aspect of the disclosure, the filter may be modeled as:

$$\frac{1}{\frac{1}{(2\pi + 15)}s + 1}$$

The modelling is for a filter of 15 Hz. S is a complex variable is the laplace frequency domain.

The frequency for the filter may be based on a target recovery time. For example, a 15 Hz frequency equals to about 10 ms. A shorter frequency increases the recovery time.

At 315, the final droop is output to adjust the common speed command.

Figure 5:
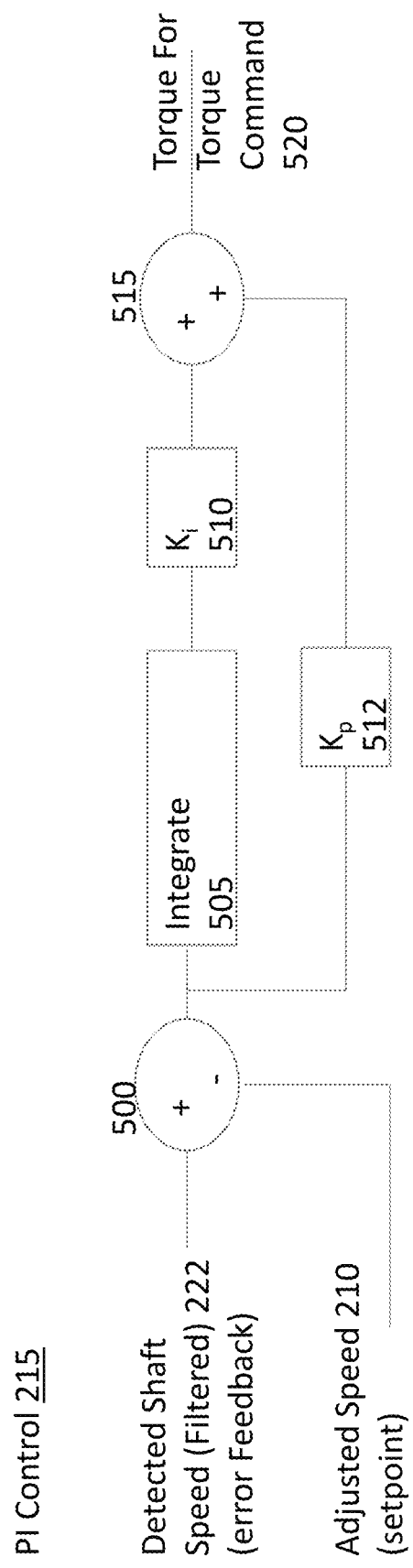
FIG. 5 illustrates PI control in accordance with aspects of the disclosure.

At 215, the inverter 24 determines the torque command for the generator 20. In an aspect of the disclosure, a proportional-integral control is executed by the inverter 24 to determine the torque command as shown in FIG. 5. The set point is the adjusted speed command 210 from the system control unit 18. The error feedback is the filtered detected speed 222 from either the speed sensor or self-detection. Control gains $K_p$ 512 and $K_i$ 510 may be used. $K_p$ 512 may have the units of Nm/RPS and the $K_i$ 510 may have units of Nm/RPS/s. The inverter 24 may determine the difference between the detected speed and the set point (subtractor 500). The difference may be integrated 505. Control gain $K_i$ 510 may be applied to the integrated difference (such as multiplied) and $K_p$ 512 applied to the difference (such as multiplied) and the two summed (adder 515) to create the torque for the torque command 520.

At 220, the inverter 24 transfers the generated torque command to the generator 20. The speed control loop is then repeated.

In an aspect of the disclosure, the system 1A, 1B, 1C may respond to a fault condition. The fault condition may be a fault in the inverter 24 or in the generator 20. The inverter 24 may have undervoltage and overvoltage protection 420. In this aspect of the disclosure, the inverter 24 may self-disable and the generator 20 (corresponding to the inverter) may produce no torque. In this aspect of the disclosure, the inverter 24 may issue a notice to the system control unit 18 via the CAN. In other aspects of the disclosure, the default may be in the CAN or the communication interface. In an aspect of the disclosure, if the system control unit 18 does not receive a message from the inverter 24 within a preset period of time, the system control unit 18 may declare a fault in the inverter 24. In an aspect of the disclosure, the system control unit 18 may issue an instruction to the faulted inverter 24 to command zero speed (go offline).

When one of the inverter 24/generator 20 (or more) of the multiple inverter 24/generators 20 goes offline and does not provide any torque, the speed of the output shaft 14 may change (transient). However, due to the speed being feedback into the droop (which in turn adjusts the commanded speed), the commanded torque for the other generators may be adjusted to counteract the transient speed change. This assumes that the other generators are not currently running at 100% capacity.

For example, when one of the generators stops producing torque, the absolute value of the torque of another generator will increase to counter the change. This may include providing all of the required power without any system level loss.

Figure 6A:
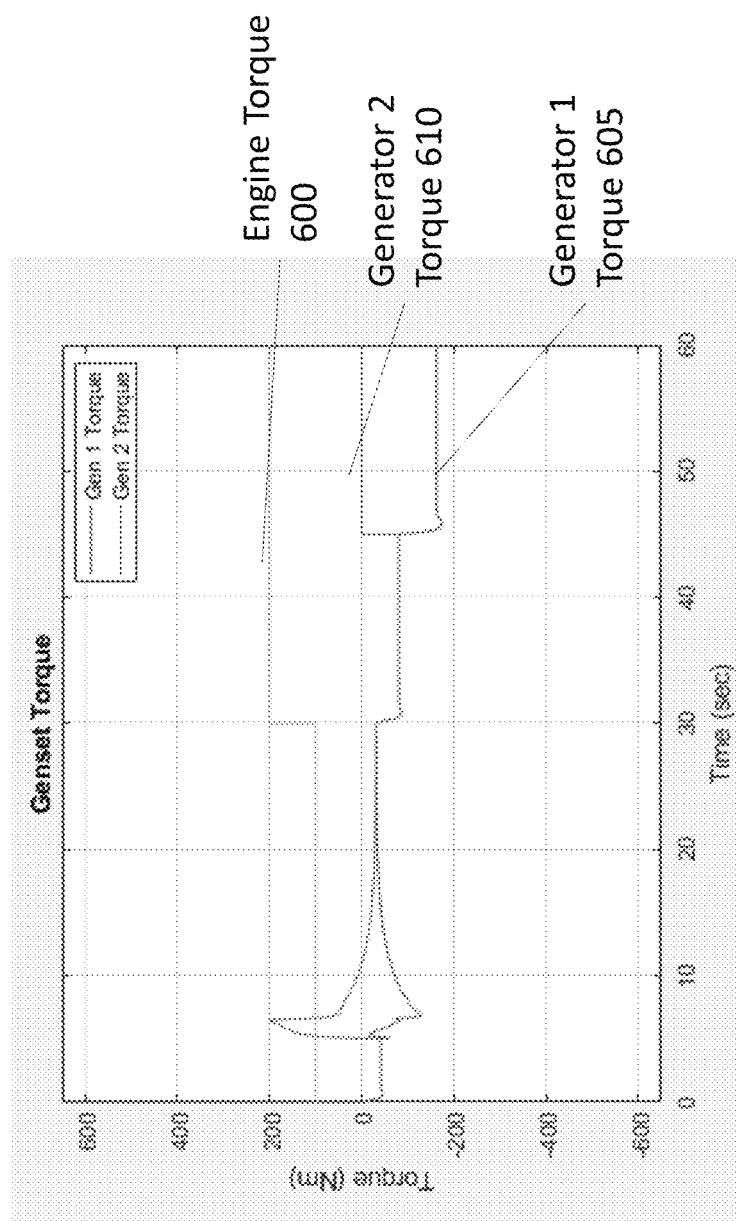
FIG. 6A illustrates an example of a torque response for two generators operated under certain conditions in accordance with aspects of the disclosure.
Figure 6B:
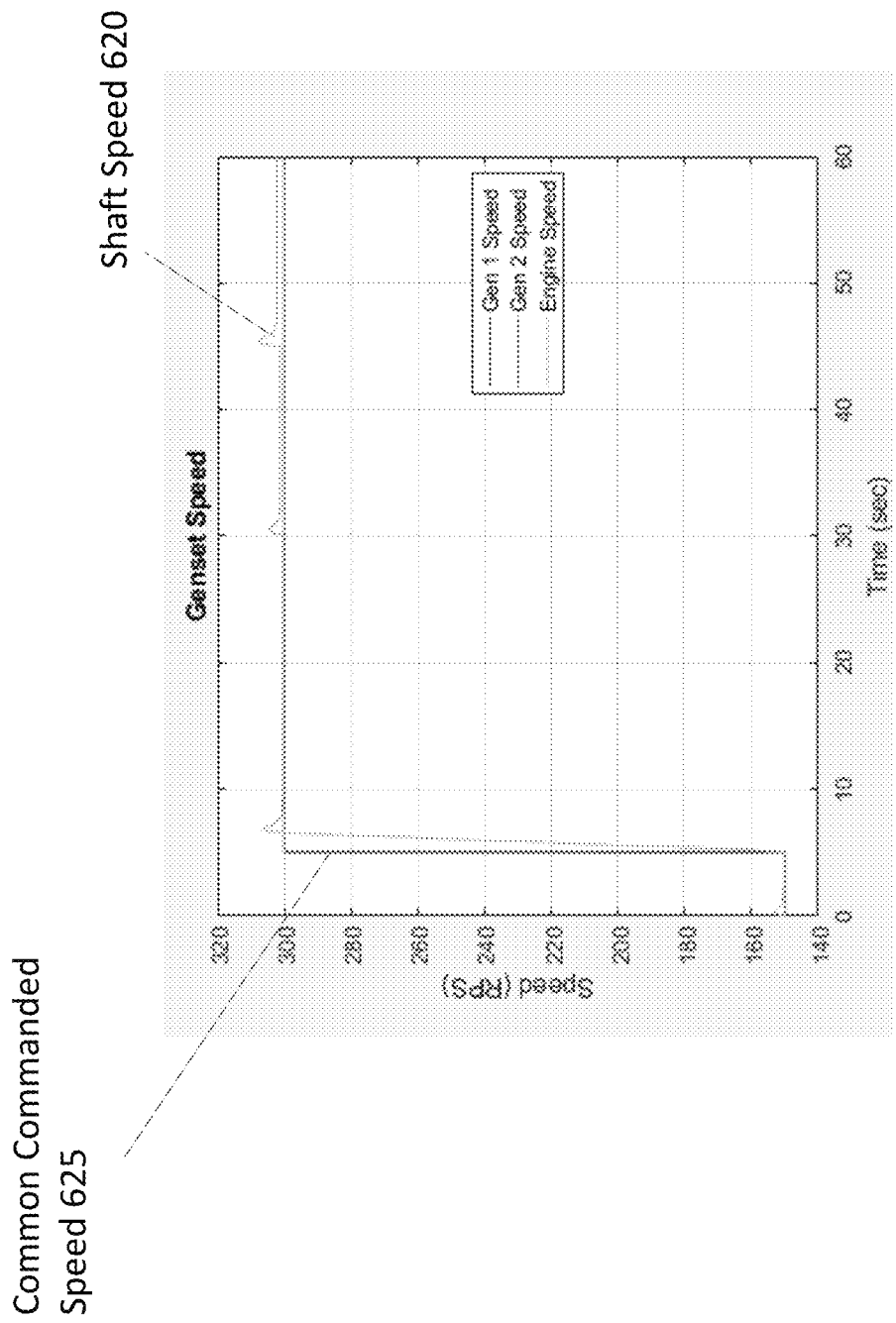
FIG. 6B illustrates an example of a speed response for two generators corresponding to the torque response in FIG. 6A in accordance with aspects of the disclosure.

FIG. 6A is an example of the torque for a two generator genset, e.g., the torque for the engine (600), torque for the generator 1 (605) and torque for generator 2 (610) for a 60 second period of time under certain conditions. In this example, both generator 1 and generator 2 are not running at capacity. FIG. 6B shows an example of the speed over the same period of time.

Initially, the engine 10 is commanded for a torque of 100 Nm. The engine torque 600 remains a 100 Nm for 0-30 seconds. Initially, generator 1 and generator 2 are commanded for a speed of about 150 RPS (common commanded speed 625). At approximately 5 second, a common speed command is issued by the system control unit 18 to increase the speed to 300. The inverter for generator 2 receives the command first and acts first. The inverter for generator 1 receives the speed command 100 ms later than the inverter for generator 2. As shown, the torque for generator 2 changes first followed by a change in the torque for generator 1. Torque is than adjusted to maintain the commanded speed (including droop adjustment). At approximately 30 seconds, the system control unit 18 issues a torque command to the engine 10 to increase the torque (from 100 Nm to 200 Nm). The change in torque results in temporary short spike in the shaft speed. In response to the change, since the inverter 24 implement a droop (with a speed feedback), the torque commands to the generators 1 and generator 2 change as shown just after 30 seconds. The absolute value of the torque from each generator increases as shown in FIG. 6A. At about 45 seconds, there is a fault associated with the generator 2 (either in the inverter or the generator itself). The inverter for generator 2 goes offline and generator 2 produces no torque. FIG. 6A shows the torque of generator 2 equal to zero after 45 seconds. This removal of the torque causes a larger spike in the shaft speed which is detected. Once again, since the inverter 24 implement a droop (with a speed feedback), the torque command to the generators 1 changes as shown just after 45 seconds to counter the change in speed. The absolute value of the torque from generator 1 (shown as 610) increases.

As seen in FIG. 6B, the shaft speed temporarily spikes (overshoots) at about 5 seconds, 30 seconds and 45 seconds, corresponding to the timing of the speed command to the inverter 24, the torque command to the engine 10 and the fault associated with generator 2. The speeds for the generator (gen 1 speed and gen 2 speed) is the common commanded speed (625) and the engine speed is the shaft speed (620). As seen in FIG. 6B, at about 5 second, the shaft speed 620 changes from about 150 RPS and ramps up past 300 RPS (higher than the common command speed of 300 RPS). The spike above 300 RPS is temporary because of the droop. However, due to the droop, the shaft speed remains slightly above the common commanded speed (between 10 second and 30 seconds, the difference is minimal because the power is low). After about 30 seconds, when the engine torque is increased, the output power increases and thus, the droop applied to the common commanded speed also increases. Therefore, as seen in FIG. 6B between about 30 second and about 45 second, the difference between the shaft speed 620 and the common commanded speed 625 is larger than prior to about 30 second. (there is a short spike in speed about 30 seconds). Further, as seen in FIG. 6B, after 45 second when the fault associated with generator 2 occurs and it goes offline, the droop causes the shaft speed 620 to increase even further away from the common commanded speed 625.

In an aspect of the disclosure, the system control unit 18 may change the common commanded speed if desired to maintain the actual shaft speed 620 at 300 RPS. It is noted that the absolute value of the generator 1 torques is less than the engine torque 600. As seen in FIG. 6A, the engine torque is 200 Nm at 50 second, but generator 1 torque is not −200 Nm, which is way the shaft speed 620 increases.

FIGS. 6A and 6B show the torque, speed for the generators 20 in generating mode.

If on the other hand, the other generators are running at 100% capacity, the speed may continue to be different from the common commanded speed issued by the system control unit 18. In an aspect of the disclosure, the detected speed of the output shaft is also transferred via CAN 28 to the system control unit 18. The system control unit 18 may determine a difference between the command commanded speed and the detected speed. When there is a difference for a period of time longer than a threshold (which is stored in memory), the system control unit 18 may issue a torque command to the engine 10 to reduce the torque.

Figure 7A:
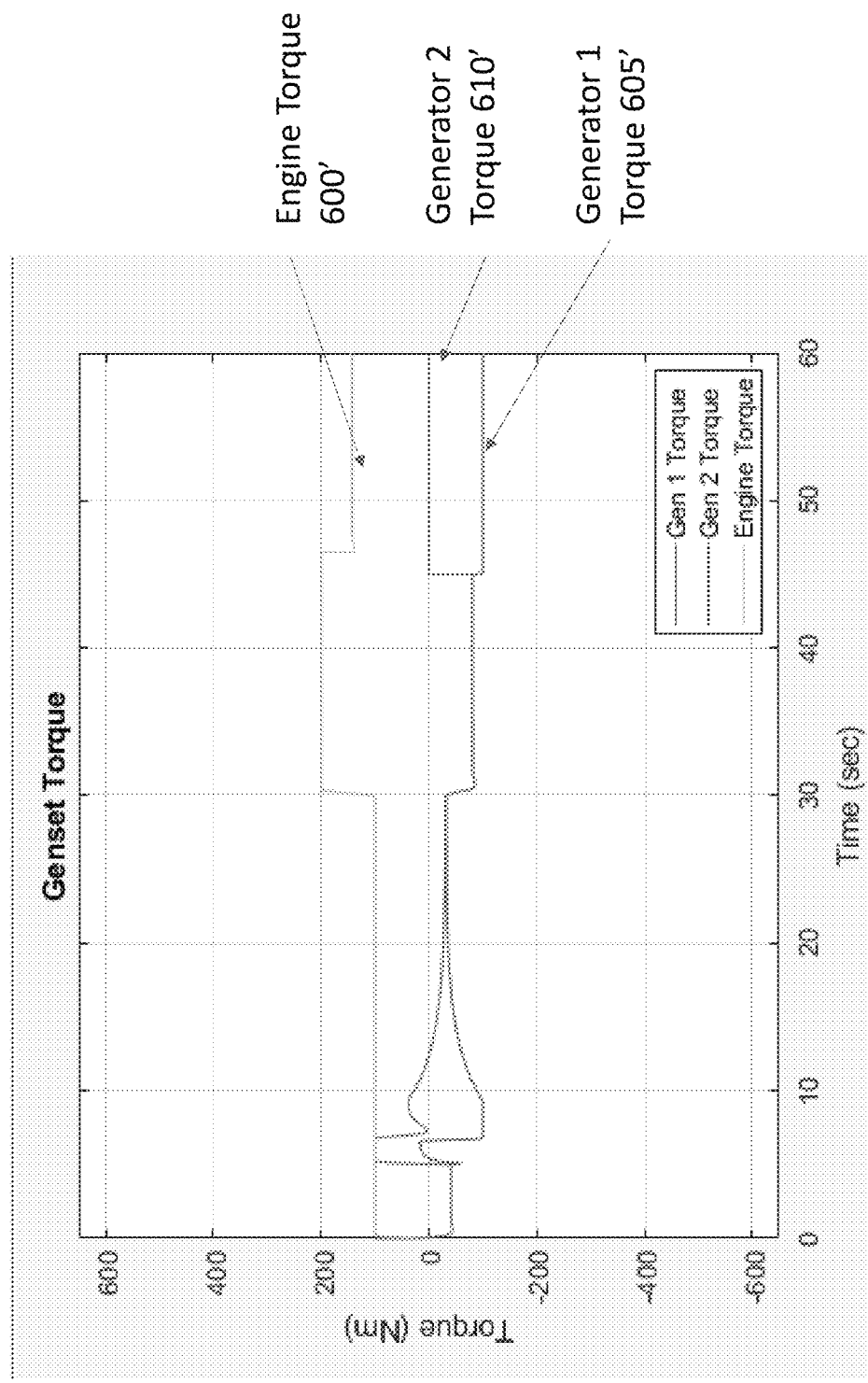
FIG. 7A illustrates another example of a torque response for two generators operated under certain conditions where there is a generator torque limit of 100 Nm and a maximum engine speed governor in accordance with aspects of the disclosure.
Figure 7B:
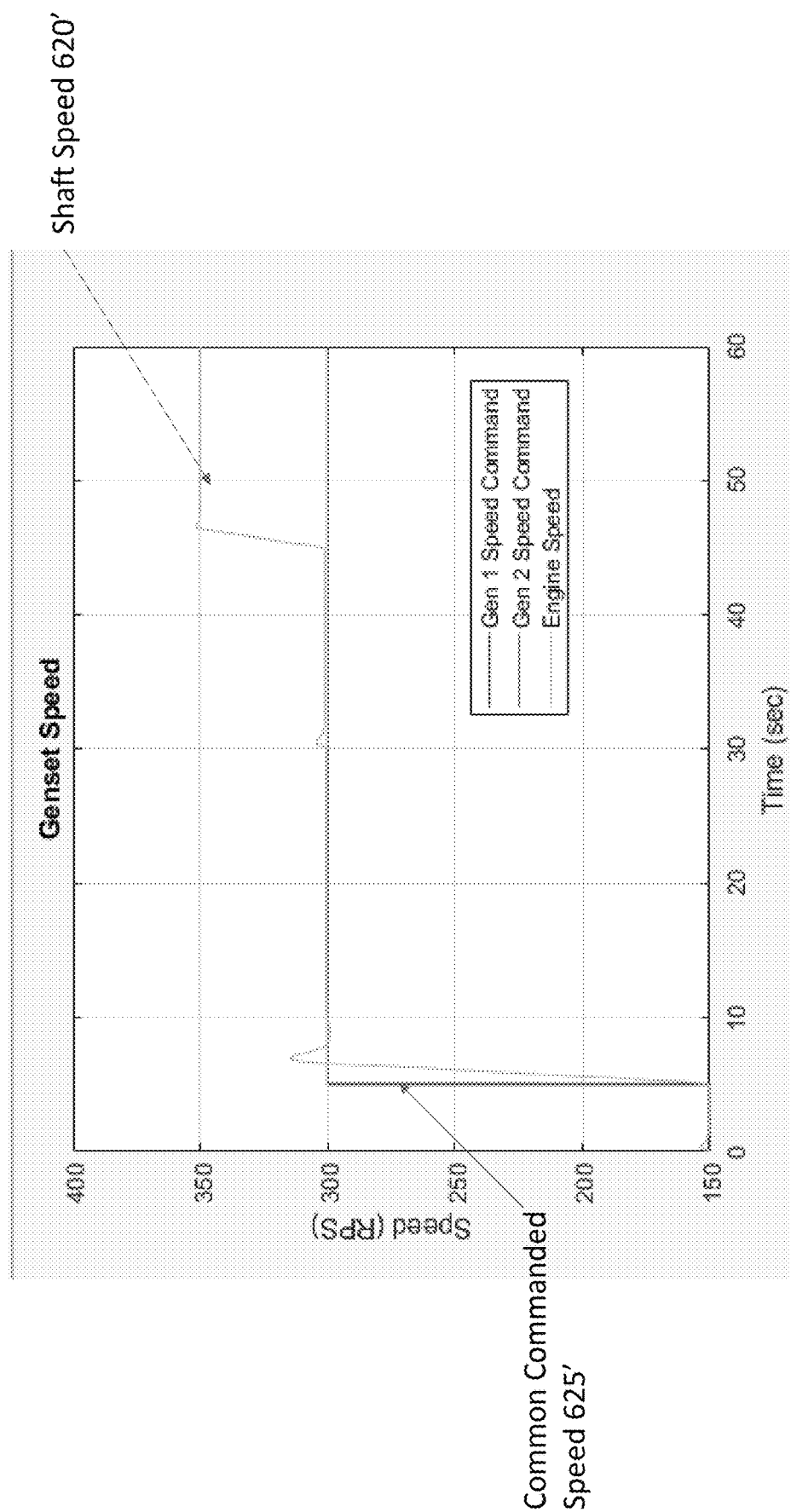
FIG. 7B illustrates another example of a speed response for two generators corresponding to the torque response in FIG. 7A in accordance with aspects of the disclosure.

FIG. 7A is another example of the torque for a two generator genset, e.g., the torque for the engine (600'), torque for the generator 1 (605') and torque for generator 2 (610') for a 60 second period of time the same hypotheticals as in FIG. 6A, common commanded speed change received at about 5 second, commanded torque change for the engine at about 30 second and fault associated with generator 2 at about 45 second. However, in this example, generator 1 and generator 2 has a maximum torque of 100 Nm. FIG. 7B shows an example of the speed over the same period of time. In this example, the engine has a maximum speed governor. The maximum speed governor in this example was 350 RPS.

Once again, the engine torque 600' is initially 100 Nm and generator 1 and generator 2 has an initial common commanded speed of 150 RPS. At about 5 seconds, the generator 1 and generator 2 changes torque (both hit the limit, generator 2 changes first because inverter for generator 2 received the common speed command first). As seen in FIG. 7B, the shaft speed 620' spikes above 300 RPS again and then settles about 300 RPS. Once again, the difference between the common commanded speed 625' and the actual shaft speed 620' is minimal between about 10 second and about 30 seconds. Although the shaft speed 620' is slightly higher at steady state due to the droop. Similarly, after about 30 seconds, when the engine torque is increased (from 100 Nm to 200 Nm), the output power increases and thus, the droop applied to the common commanded speed also increases. Therefore, as seen in FIG. 7B between about 30 second and about 45 second, the difference between the shaft speed 620' and the common commanded speed 625' is larger than prior to about 30 second. (there is a short spike in speed about 30 second).

However, now when generator 2 goes offline at about 45 seconds, since there is a torque limit of 100 Nm, generator 1 is not able to meet the demand. While the droop causes, the generator 1 torque 605' to change in response to the speed change, the torque change is capped at 100 Nm. As seen in FIG. 7A, after about 45 seconds, generator 1 torque 605' is 100 Nm. But, since the engine torque 600' is 200 Nm there is an imbalance and the shaft speed increases 620'. In this case, the generator 1 cannot fully offset the increase. The shaft speed 620' increases to 350 RPS (speed governor of the engine). Also, in this case, since the shaft speed increased, it reached the speed governor of the engine 10 and thus at about 47 seconds, the engine control unit 12 sus-sponte reduced its own torque to balance the torques to cap the speed at or below the speed governor. As can be seen, the speed change stops ramping and holds at the speed governor.

As used herein, the term "processor" may include a single core processor, a multi-core processor, multiple processors located in a single device, or multiple processors in wired or wireless communication with each other and distributed over a network of devices, the Internet, or the cloud. Accordingly, as used herein, functions, features or instructions performed or configured to be performed by a "processor", may include the performance of the functions, features or instructions by a single core processor, may include performance of the functions, features or instructions collectively or collaboratively by multiple cores of a multi-core processor, or may include performance of the functions, features or instructions collectively or collaboratively by multiple processors, where each processor or core is not required to perform every function, feature or instruction individually.

Various aspects of the present disclosure may be embodied as a program, software, or computer instructions embodied or stored in a computer or machine usable or readable medium, or a group of media which causes the computer or machine to perform the steps of the method when executed on the computer, processor, and/or machine. A program storage device readable by a machine, e.g., a computer readable medium, tangibly embodying a program of instructions executable by the machine to perform various functionalities and methods described in the present disclosure is also provided, e.g., a computer program product.

The computer readable medium could be a computer readable storage device or a computer readable signal medium. A computer readable storage device, may be, for example, a magnetic, optical, electronic, electromagnetic, infrared, or semiconductor system, apparatus, or device, or any suitable combination of the foregoing; however, the computer readable storage device is not limited to these examples except a computer readable storage device excludes computer readable signal medium. Additional examples of the computer readable storage device can include: a portable computer diskette, a hard disk, a magnetic storage device, a portable compact disc read-only memory (CD-ROM), a random access memory (RAM), a read-only memory (ROM), an erasable programmable read-only memory (EPROM or Flash memory), an optical storage device, or any appropriate combination of the foregoing; however, the computer readable storage device is also not limited to these examples. Any tangible medium that can contain, or store, a program for use by or in connection with an instruction execution system, apparatus, or device could be a computer readable storage device.

A computer readable signal medium may include a propagated data signal with computer readable program code embodied therein, such as, but not limited to, in baseband or as part of a carrier wave. A propagated signal may take any of a plurality of forms, including, but not limited to, electromagnetic, optical, or any suitable combination thereof. A computer readable signal medium may be any computer readable medium (exclusive of computer readable storage device) that can communicate, propagate, or transport a program for use by or in connection with a system, apparatus, or device. Program code embodied on a computer readable signal medium may be transmitted using any appropriate medium, including but not limited to wireless, wired, optical fiber cable, RF, etc., or any suitable combination of the foregoing.

The terminology used herein is for the purpose of describing particular embodiments only and is not intended to be limiting the scope of the disclosure and is not intended to be exhaustive. Many modifications and variations will be apparent to those of ordinary skill in the art without departing from the scope and spirit of the disclosure.

What is claimed is:

1. A system comprising:
    a first processor; and
    at least two inverters operably connectable to at least two generators, respectively, the at least two generators are mechanically coupleable to a same output shaft of an engine, the at least two generators each producing AC power to the respective inverter, each inverter providing DC power to a DC link,
    each inverter comprises an inverter processor configured to control a respective generator, the inverter processor is configured to receive a common speed command from the first processor, each said inverter processor further configured to adjust the common speed command based on a speed of the same output shaft to create a droop based on the speed of the output shaft, determine a torque command based on the adjusted speed command and supply the determined torque command to the corresponding generator;
    wherein each inverter processor is configured to determine the droop by applying a set droop gain to a power output by the corresponding generator and subtract the droop from the common speed command from the first processor, said droop gain being greater than an amount necessary to counter timing differences between each inverter.

2. The system of claim 1, wherein the first processor is configured to output a torque command to the engine and the common speed command to each inverter via a controller area network (CAN) based on a target system power level.

3. The system of claim 2, further comprising:
    the engine having the same output shaft;
    the at least two generator; and
    each DC link.

4. The system of claim 3, wherein each generator is a permanent magnet generator.

5. The system of claim 1, further comprising one or more speed sensors configured to determine a speed associated with the same output shaft.

6. The system of claim 1, wherein the speed is determined without sensors and based on back EMF.

7. The system of claim 1, wherein the processor in each inverter determines the torque command based on the adjusted speed command using proportional integral control.

8. The system of claim 1, wherein the common speed command is asynchronously received by the processor in each inverter.

9. The system of claim 1, wherein when a fault is detected in an inverter or a corresponding generator, the processor in the other inverters is configured to respond to the fault by adjusting torque command to the generator.

10. The system of claim 9, wherein the processor in an inverter is configured to a disable the inverter which the fault is detected or the invertor which corresponds to a generator which the fault is detected such that the generator does not provide any torque.

11. The system of claim 1, wherein the at least two generators are two permanent magnet generators.

12. The system of claim 1, further comprising a gearbox, wherein an input shaft of the gearbox is connected to the same output shaft of the engine and the generators are mounted on one or more output shafts of the gearbox, respectively.

13. A hybrid electric vehicle (HEV) comprising:
an internal combustion engine having an output shaft;
at least two generators mechanically coupled to the same output shaft;
at least two inverters connected to the at least two generators, respectively, each generator respectively producing three phase AC, each inverter providing DC power to a DC link; and
a system processor connected to the internal combustion engine and the at least two inverters via a controller area network (CAN), the system processor configured to issue a common speed command to each inverter via the CAN to achieve a target power level,
each inverter comprises an inverter processor configured to control the corresponding generator, each said inverter processor is configured to receive the common speed command from the system processor, each said inverter processor further configured to adjust the common speed command based on a speed of the same output shaft to create a droop based on the speed of the output shaft, determine a torque command based on the adjusted speed command and supply the determined torque command to the respective generator;
wherein the processor in each inverter is configured to determine the droop by applying a set droop gain to a power output by the respective generator and subtract the droop from the common speed command from the system processor, said droop gain being greater than an amount necessary to counter timing differences between each inverter.

14. The HEV of claim 13, wherein the system processor is configured to issue a torque command to the internal combustion engine.

15. The HEV of claim 13, further comprising one or more speed sensors configured to determine a speed associated with the same output shaft.

16. The HEV of claim 15, further comprising a gearbox, wherein an input shaft of the gearbox is connected to the same output shaft of the engine and the generators are mounted on one or more output shafts of the gearbox, respectively, wherein the one or more speed sensors detect the speed of the same output shaft of the engine or the one or more output shafts of the gearbox.

17. The HEV of claim 13, wherein the system processor is configured to issue a disable command to an inverter in response to a detection of a fault condition at the inverter or a generator corresponding to the inverter.

18. The HEV of claim 17, wherein in response to a detection of a fault condition at an inverter or a generator corresponding to the inverter, the processor in the other inverters is configured to adjust the torque command to its corresponding generator.

\* \* \* \* \*